United States Patent
Li et al.

(10) Patent No.: US 10,496,084 B2
(45) Date of Patent: Dec. 3, 2019

(54) DEQUANTIZING LOW-RESOLUTION IOT SIGNALS TO PRODUCE HIGH-ACCURACY PROGNOSTIC INDICATORS

(71) Applicant: Oracle International Corporation, Redwood Shores, CA (US)

(72) Inventors: Mengying Li, La Jolla, CA (US); Kenny C. Gross, Escondido, CA (US)

(73) Assignee: Oracle International Corporation, Redwood Shores, CA (US)

( * ) Notice: Subject to any disclaimer, the term of this patent is extended or adjusted under 35 U.S.C. 154(b) by 126 days.

(21) Appl. No.: 15/947,548

(22) Filed: Apr. 6, 2018

(65) Prior Publication Data
US 2019/0310617 A1    Oct. 10, 2019

(51) Int. Cl.
| | |
|---|---|
| G06F 11/00 | (2006.01) |
| G05B 23/02 | (2006.01) |
| G06F 11/30 | (2006.01) |
| G06F 17/14 | (2006.01) |
| G06N 20/00 | (2019.01) |

(52) U.S. Cl.
CPC ........ G05B 23/0254 (2013.01); G06F 11/008 (2013.01); G06F 11/3058 (2013.01); G06F 17/142 (2013.01); *G06N 20/00* (2019.01)

(58) Field of Classification Search
CPC .............. G05B 23/0254; G06F 17/142; G06F 11/3058; G06F 11/008; G06N 20/00
See application file for complete search history.

(56) References Cited

U.S. PATENT DOCUMENTS

| | | |
|---|---|---|
| 5,369,403 A | 11/1994 | Temes et al. |
| 7,248,980 B1 | 7/2007 | Gross et al. |

(Continued)

FOREIGN PATENT DOCUMENTS

| | | |
|---|---|---|
| EP | 2381684 A1 | 10/2011 |
| WO | 8908360 A1 | 9/1989 |

*Primary Examiner* — Jason B Bryan
(74) *Attorney, Agent, or Firm* — Park, Vaughan, Fleming & Dowler LLP

(57) ABSTRACT

The disclosed embodiments relate to a system that removes quantization effects from a set of time-series signals to produce highly accurate approximations of a set of original unquantized signals. During operation, for each time-series signal in the set of time-series signals, the system determines a number of quantization levels ($N_{QL}$) in the time-series signal. Next, the system performs a fast Fourier transform (FFT) on the time-series signal to produce a set of Fourier modes for the time-series signal. The system then determines an optimal number of Fourier modes ($N_{mode}$) to reconstruct the time-series signal based on the determined $N_{QL}$ for the time-series signal. Next, the system selects $N_{mode}$ largest-amplitude Fourier modes from the set of Fourier modes for the time-series signal. The system then performs an inverse FFT operation using the $N_{mode}$ largest-amplitude Fourier modes to produce a dequantized time-series signal to be used in place of the time-series signal.

14 Claims, 18 Drawing Sheets
(4 of 18 Drawing Sheet(s) Filed in Color)

(56) References Cited

U.S. PATENT DOCUMENTS

| | | | |
|---|---|---|---|
| 7,573,952 B1 | 8/2009 | Thampy et al. | |
| 7,921,350 B2 * | 4/2011 | Eklund | G06F 11/0751 |
| | | | 714/48 |
| 8,294,605 B1 | 10/2012 | Pagnanelli | |
| 9,515,674 B2 | 12/2016 | Maehata | |
| 2010/0100337 A1 * | 4/2010 | Vichare | G06F 11/008 |
| | | | 702/34 |
| 2016/0116378 A1 * | 4/2016 | Bates | G05B 23/024 |
| | | | 702/182 |
| 2016/0328646 A1 | 11/2016 | Lin et al. | |
| 2016/0350194 A1 * | 12/2016 | Mohan | G05B 23/0254 |
| 2017/0077944 A1 | 3/2017 | Pagnanelli | |
| 2018/0217585 A1 * | 8/2018 | Giering | G05B 23/0254 |

\* cited by examiner

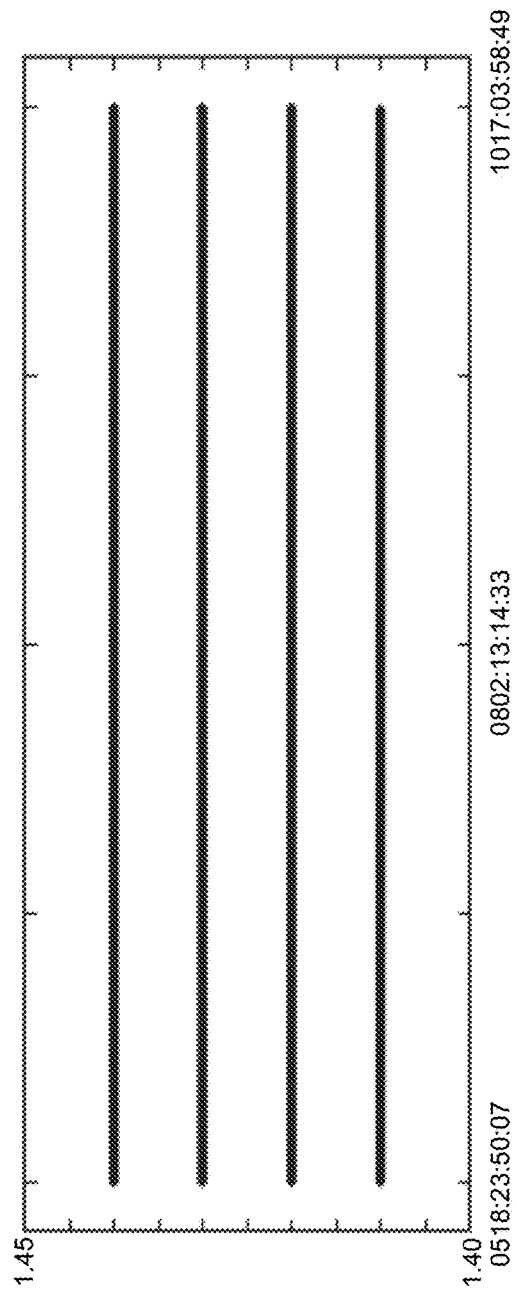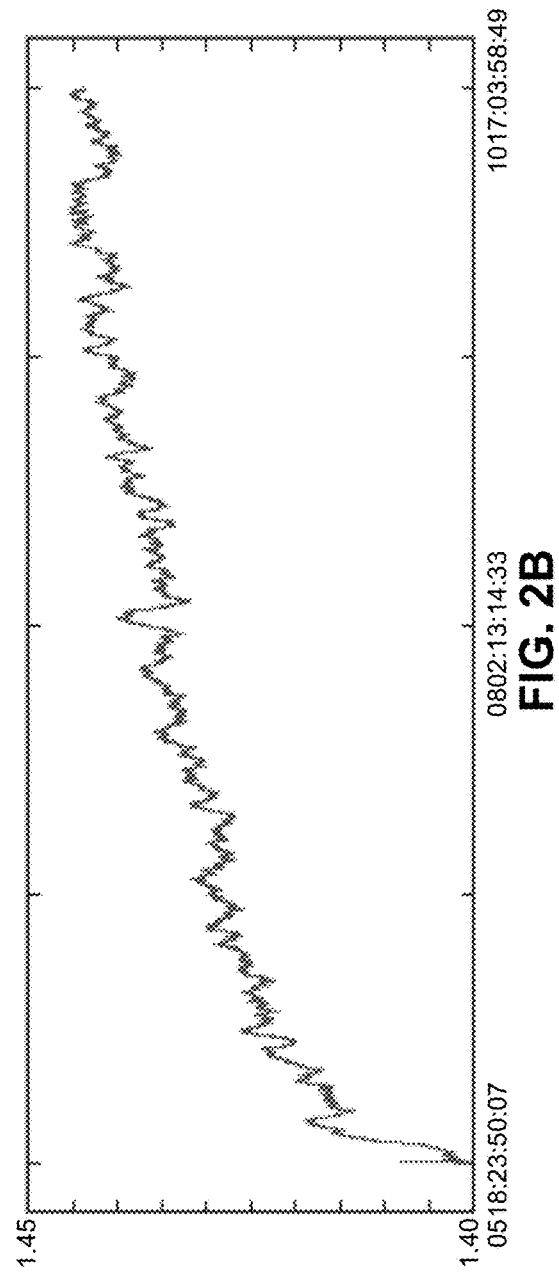

| Quantization level | number of modes | average RMSE |
|---|---|---|
| 2 | 1 | 0.5684 |
| 3 | 9 | 0.2616 |
| 4 | 13 | 0.2353 |
| 5 | 15 | 0.2150 |
| 6 | 15 | 0.2084 |
| 7 | 16 | 0.2054 |
| 8 | 17 | 0.2032 |
| 9 | 15 | 0.2019 |
| 10 | 15 | 0.2008 |
| 11 | 17 | 0.2006 |
| 12 | 15 | 0.1999 |
| 13 | 16 | 0.1997 |
| 14 | 18 | 0.1995 |
| 15 | 17 | 0.1989 |
| 16 | 18 | 0.1986 |

FIG. 7C

DEQUANTIZING LOW-RESOLUTION IOT SIGNALS TO PRODUCE HIGH-ACCURACY PROGNOSTIC INDICATORS

BACKGROUND

Field

The disclosed embodiments generally relate to techniques for using telemetry data obtained from sensors to proactively detect impending problems in a monitored system. More specifically, the disclosed embodiments provide a technique for removing quantization effects from low-resolution Internet-of-Things (IoT) signals to produce dequantized signals, which can subsequently be used to detect impending anomalies in an IoT system.

Related Art

Recent advances in IoT technology presently enable millions of IoT objects to be sensed and controlled remotely over an existing network infrastructure. These IoT objects can include various machines, physical devices, vehicles and appliances, which are associated with various industries, including utilities, oil and gas, transportation, manufacturing, and enterprise computing systems.

These IoT objects are often equipped with a significant number of sensors, which monitor signals during operation of the IoT objects. Results from this monitoring process can be used to generate time-series signals, which can subsequently be analyzed to determine how well an IoT object is operating. One particularly desirable application of these time-series signals is to facilitate "proactive fault monitoring" to identify indicators of impending component or system failures before the failures actually occur.

Unfortunately, many of these IoT objects are equipped with low-resolution analog-to-digital (A/D) converters for all of their sensors. This causes readings of physical variables, such as voltage, current, and temperature, to be highly quantized. Hence, the signal values from these sensors can only assume discrete values, and no readings can be reported between these discrete values.

These quantization effects can create problems during proactive fault monitoring. Normally, one can apply statistical pattern-recognition techniques to continuous signal values to determine if the signals start to drift away from steady-state values at early stages of system degradation. However, with significant quantization, modern statistical pattern-recognition techniques, such as machine-learning (ML) techniques and deep-learning (DL) techniques, cannot be used effectively to detect the onset of subtle anomalies that might precede a failure.

Hence, what is needed is a technique that mitigates the effects of quantization in time-series signals from IoT objects to facilitate proactive fault monitoring.

SUMMARY

The disclosed embodiments relate to a system that removes quantization effects from a set of time-series signals to produce highly accurate approximations of a set of original unquantized signals. During operation, for each time-series signal in the set of time-series signals, the system determines a number of quantization levels ($N_{QL}$) in the time-series signal. Next, the system performs a fast Fourier transform (FFT) on the time-series signal to produce a set of Fourier modes for the time-series signal. The system then determines an optimal number of Fourier modes ($N_{mode}$) to reconstruct the time-series signal based on the determined $N_{QL}$ for the time-series signal. Next, the system selects $N_{mode}$ largest-amplitude Fourier modes from the set of Fourier modes for the time-series signal. The system then performs an inverse FFT operation using the $N_{mode}$ largest-amplitude Fourier modes to produce a dequantized time-series signal to be used in place of the time-series signal.

In some embodiments, when $N_{QL}$ is greater than or equal to an acceptable number of quantization levels, the system does not perform the dequantization operation on the time-series signal because the time-series signal already possesses the acceptable number of quantization levels.

In some embodiments, when $N_{QL}$ is greater than or equal to a minimum fraction of the number of quantized values in the time-series signal, the system does not perform the dequantization operation on the time-series signal because the time-series signal possesses an insufficient number of quantized values to perform the dequantization operation.

In some embodiments, when $N_{QL}=2$, instead of performing the FFT and the inverse FFT operations to dequantize the signal, the system: computes a frequency $F_{lower}$ for a lower quantization level of the two quantization levels in a moving window that slides across the signal; and computes the dequantized signal to be $2 \times F_{lower} - 1$ assuming the two quantization levels are −1 and 1.

In some embodiments, while determining the number of quantization levels in the time-series signal, the system sorts the quantized values in the time-series signal to produce a sorted signal. Next, the system computes a first-order numerical derivative of the sorted signal. Finally, the system determines $N_{QL}$ to be a number of non-zero derivatives in the first-order numerical derivative of the sorted signal plus one.

In some embodiments, while determining $N_{mode}$ for the time-series signal, the system performs a lookup in a library of pre-determined optimal $N_{mode}$ values based on the determined $N_{QL}$ for the time-series signal.

In some embodiments, while detecting an incipient anomaly, the system detects an impending failure of the monitored system.

In some embodiments, the system additionally analyzes the set of time-series signals using a prognostic-surveillance system to detect incipient anomalies that arise during execution of a monitored system, and when the prognostic-surveillance system detects an anomaly, generates an alarm.

In some embodiments, while analyzing the set of time-series signals, the system uses an inferential model trained on previously received time-series signals from the monitored system to generate estimated values for the time-series signals based on correlations between the time-series signals. Next, the system performs a pairwise differencing operation between actual values and the estimated values for the time-series signals to produce residuals. Finally, the system performs a sequential probability ratio test (SPRT) on the residuals to detect incipient anomalies that arise during operation of the monitored system.

In some embodiments, the inferential model is trained using a nonlinear, nonparametric (NLNP) regression technique.

In some embodiments, the NLNP regression technique comprises the Multivariate State Estimation Technique (MSET).

BRIEF DESCRIPTION OF THE FIGURES

The patent or application file contains at least one drawing executed in color. Copies of this patent or patent application publication with color drawing(s) will be provided by the Office upon request and payment of the necessary fee.

FIG. 2A illustrates a low-resolution quantized telemetry signal in accordance with the disclosed embodiments.

FIG. 2B illustrates a corresponding high-resolution quantized telemetry signal in accordance with the disclosed embodiments.

FIG. 7C presents a table containing the optimal number of Fourier modes in accordance with the disclosed embodiments.

DETAILED DESCRIPTION

The following description is presented to enable any person skilled in the art to make and use the present embodiments, and is provided in the context of a particular application and its requirements. Various modifications to the disclosed embodiments will be readily apparent to those skilled in the art, and the general principles defined herein may be applied to other embodiments and applications without departing from the spirit and scope of the present embodiments. Thus, the present embodiments are not limited to the embodiments shown, but are to be accorded the widest scope consistent with the principles and features disclosed herein.

The data structures and code described in this detailed description are typically stored on a computer-readable storage medium, which may be any device or medium that can store code and/or data for use by a computer system. The computer-readable storage medium includes, but is not limited to, volatile memory, non-volatile memory, magnetic and optical storage devices such as disk drives, magnetic tape, CDs (compact discs), DVDs (digital versatile discs or digital video discs), or other media capable of storing computer-readable media now known or later developed.

The methods and processes described in the detailed description section can be embodied as code and/or data, which can be stored in a computer-readable storage medium as described above. When a computer system reads and executes the code and/or data stored on the computer-readable storage medium, the computer system performs the methods and processes embodied as data structures and code and stored within the computer-readable storage medium.

Furthermore, the methods and processes described below can be included in hardware modules. For example, the hardware modules can include, but are not limited to, application-specific integrated circuit (ASIC) chips, field-programmable gate arrays (FPGAs), and other programmable-logic devices now known or later developed. When the hardware modules are activated, the hardware modules perform the methods and processes included within the hardware modules.

Exemplary Prognostic-Surveillance System

The above-mentioned dequantization process is used to facilitate downstream prognostic-surveillance operations involving the time-series signals. For example, FIG. 1 illustrates an exemplary prognostic-surveillance system 100 that makes use of a time-series database 106 that contains such time-series signals in accordance with the disclosed embodiments.

Figure 1:
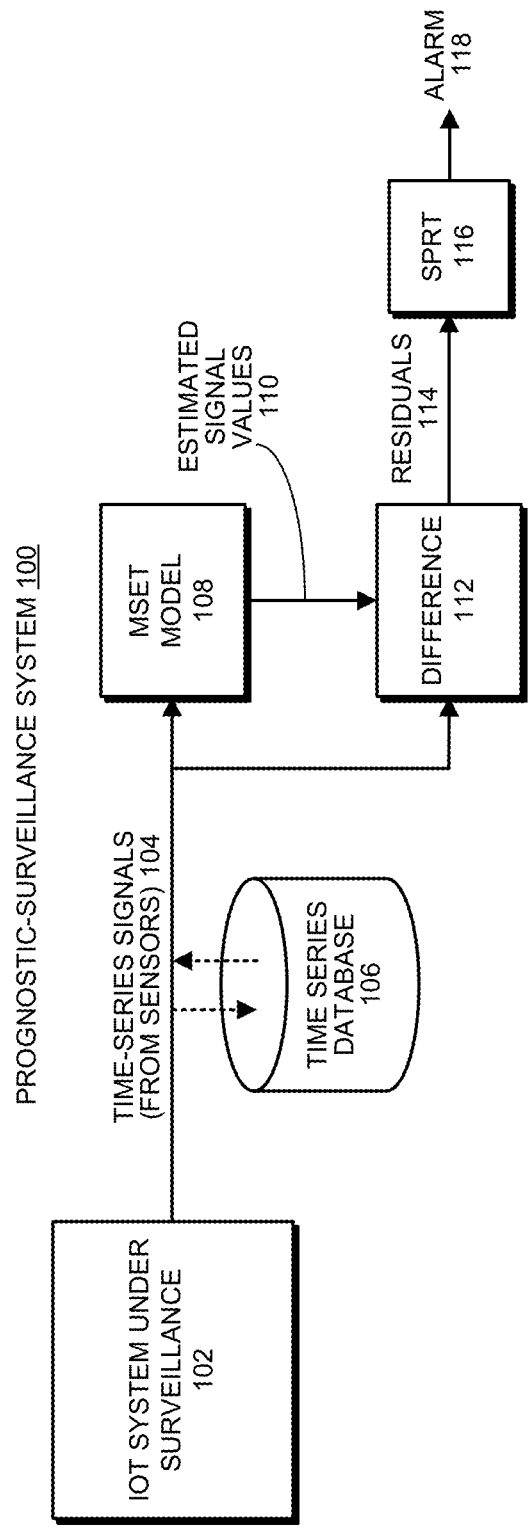
FIG. 1 illustrates an exemplary prognostic-surveillance system in accordance with the disclosed embodiments.

As illustrated in FIG. 1, system 100 operates on a set of time-series signals 104 obtained from sensors in an IoT system under surveillance 102. Note that critical assets 102 can generally include any type of machinery or facility, which includes sensors and generates time-series signals. Moreover, time-series signals 104 can originate from any type of sensor, which can be located in a component in critical assets 102, including: a voltage sensor; a current sensor; a pressure sensor; a rotational speed sensor; and a vibration sensor.

During operation of prognostic-surveillance system 100, time-series signals 104 can feed into a time-series database 106, which stores the time-series signals 104 for subsequent analysis. Next, the time-series signals 104 either feed directly from critical assets 102 or from time-series database 106 into an MSET pattern-recognition model 108. Although it is advantageous to use MSET for pattern-recognition purposes, the disclosed embodiments can generally use any one of a generic class of pattern-recognition techniques called nonlinear, nonparametric (NLNP) regression, which includes neural networks, support vector machines (SVMs), auto-associative kernel regression (AAKR), and even simple linear regression (LR).

Next, MSET model 108 is "trained" to learn patterns of correlation among all of the time-series signals 104. This training process involves a one-time, computationally intensive computation, which is performed offline with accumulated data that contains no anomalies. The pattern-recognition system is then placed into a "real-time surveillance mode," wherein the trained MSET model 108 predicts what each signal should be, based on other correlated variables; these are the "estimated signal values" 110 illustrated in FIG. 1. Next, the system uses a difference module 112 to perform a pairwise differencing operation between the actual signal values and the estimated signal values to produce residuals 114. The system then performs a "detection operation" on the residuals 114 by using SPRT module 116 to detect anomalies and possibly to generate an alarm 118. (For a description of the SPRT model, please see Wald, Abraham, June 1945, "Sequential Tests of Statistical Hypotheses." *Annals of Mathematical Statistics.* 16 (2): 117-186.) In this way, prognostic-surveillance system 100 can proactively alert system operators of incipient anomalies, such as impending failures, hopefully with enough lead time so that such problems can be avoided or proactively fixed.

Dequantizing Telemetry Signals

The disclosed embodiments provide a system that dequantizes a set of quantized IoT telemetry signals, which may contain hundreds or thousands of sensor signals. During operation, the system first determines the number of quantization levels for each of the signals, and then dequantizes the signals using a new technique, which is optimized for the number of quantization levels for the individual signals. This new technique works even for the extreme case of just two quantization levels, which was not previously possible.

Some years ago, researchers at Sun Microsystems, Inc., introduced a technique for dequantizing individual telemetry signals to enhance the accuracy of "downstream" prognostic-surveillance mechanisms. (See U.S. Pat. No. 7,248,980, entitled "Spectral Synthesis of Telemetry Signals to Remove Signal Quantization Effects," by inventors Kenny C. Gross, et al., filed 26 Jan. 2006.) Unfortunately, new challenges are arising in dense-sensor IoT industries, which make the above-listed prior technique inadequate. The prior technique was applied to one signal at a time, and required human input for its application. Moreover, the prior technique was developed for signals in enterprise computer systems, wherein the technique provided great value, but was used by human computer experts who were intimately familiar with the types of sensors used in the computers, and who would examine the graphs of the outputs of those sensors, and could see and label the quantized signals, including determining the number of quantization levels for the various quantized signals.

However, for large-scale IoT prognostic applications that monitor an extremely large number of signals, it is not practical to have humans look at all of the signals to decide whether they are quantized, and to count how many levels of quantization exist for each signal. For example, a medium-sized data center can include over 1,000,000 sensors monitoring thousands of business-critical servers, a modern passenger jet can include 75,000 sensors, and a modern oil refinery can include over 1,000,000 sensors. Note that a significant fraction of these sensors produce quantized signals having various levels of quantization.

What is needed is a technique that can examine a large set of sensor signals, automatically identify the signals that are quantized, and then automatically determine the number of levels of quantization for the identified signals. This facilitates dequantizing the identified signals in a manner that is optimized for the number of quantization levels, including for the "worst case" lowest-resolution signals that produce only two quantization levels.

Figure 2C:
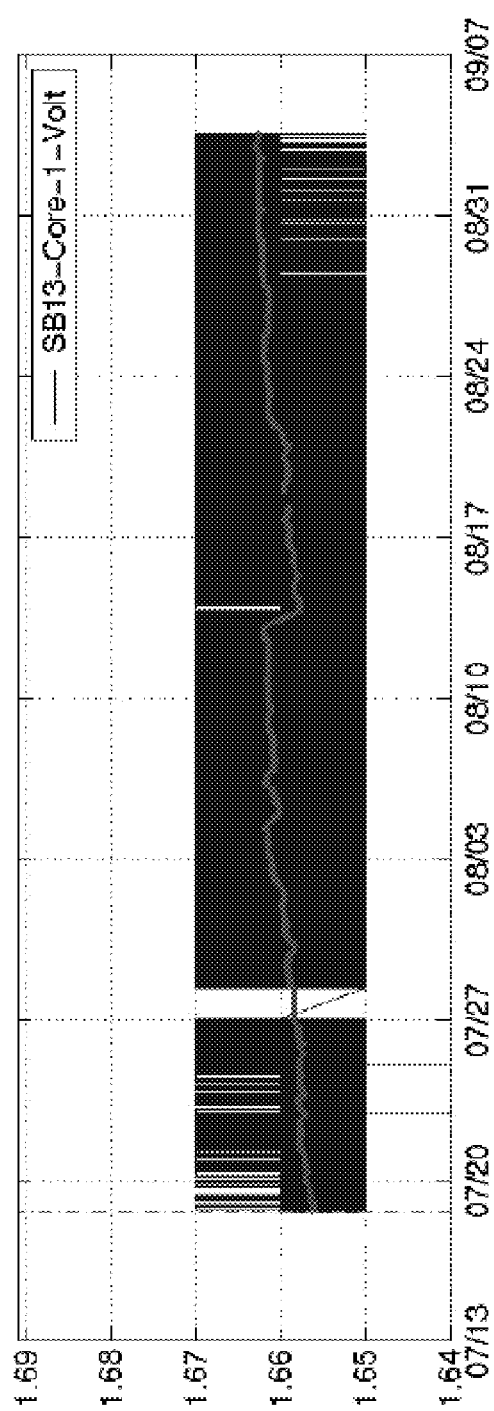
FIG. 2C illustrates a series of voltage measurements, wherein the red line represents the actual signal and the blue line represents the quantized signal in accordance with the disclosed embodiments.
Figure 2D:
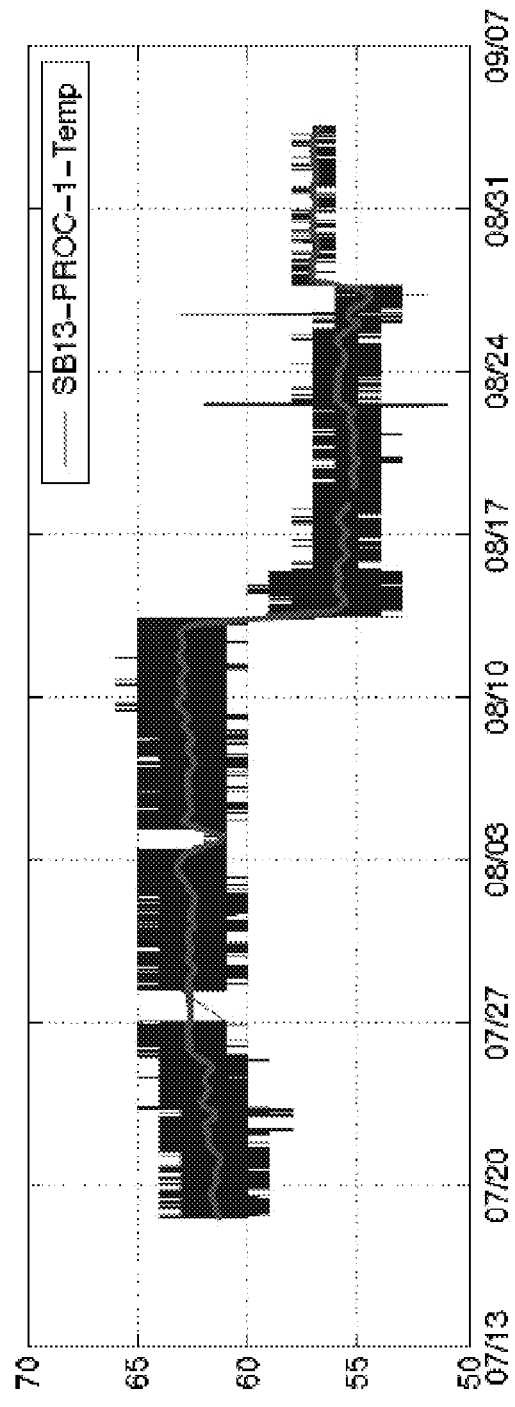
FIG. 2D illustrates a series of temperature measurements, wherein the red line represents the actual signal and the blue line represents the quantized signal in accordance with the disclosed embodiments.

The problem presented by quantized signals is illustrated in the graphs that appear in FIGS. 2A-2B. The signal line in FIG. 2A illustrates a raw telemetry signal that comes from an 8-bit A/D chip, which in this example originates from a computer server. In contrast, the signal line in FIG. 2B illustrates the same signal with higher resolution. Note that with only 8-bit resolution, it is difficult (if not impossible) to detect subtle degradation in the signal, either by human visual inspection or by automated pattern recognition. A second example, also involving signals generated by an electronic system, is illustrated in FIGS. 2C-2D. In FIGS. 2C-2D, the blue signal lines illustrate the raw signals reported from 8-bit A/D chips, and the red signal lines show the actual value of the signal being monitored. Note that FIG. 2C illustrates voltage, and FIG. 2D illustrates temperature.

When engineers first started digitizing transducer signals in the computing industry, there was no reason not to use inexpensive 8-bit A/D chips, because the output signal was only going to be compared against a high or low threshold to generate an alarm or shut down the system. For example, if a temperature of a component reaches 85° C., then an alarm needs to sound or the system needs to be shut down, before it catches fire. Moreover, if a voltage level "droops" by 10% of nominal, there likely is an electrical malfunction and an alarm also needs to be sounded. System designers in the above-mentioned industries never anticipated needing the signal resolution to be 0.1% when a mean value of a signal is only going to be compared to a threshold value.

However, the recent advent of machine-learning (ML)-based prognostic techniques has provided a radically new value proposition. By analyzing a multitude of disparate signals from critical assets and then "learning" patterns of correlation among these signals, it is possible to detect the onset of subtle degradation modes, long before the conventional thresholds might be tripped. This facilitates "predictive maintenance," which involves intervening and fixing very small anomalies before they evolve into serious, costly, or dangerous problems for critical assets. In this context, low-resolution A/D chips are suddenly problematic because quantized signals obscure the correlation patterns on which ML-based prognostic techniques rely. Hence, in order to take advantage of ML-based prognostic techniques for large-scale systems that produce thousands or millions of sensor signals, it is necessary to develop an effective technique for automatically dequantizing the sensor signals, without the human intervention required by existing dequantization techniques.

Figure 3:
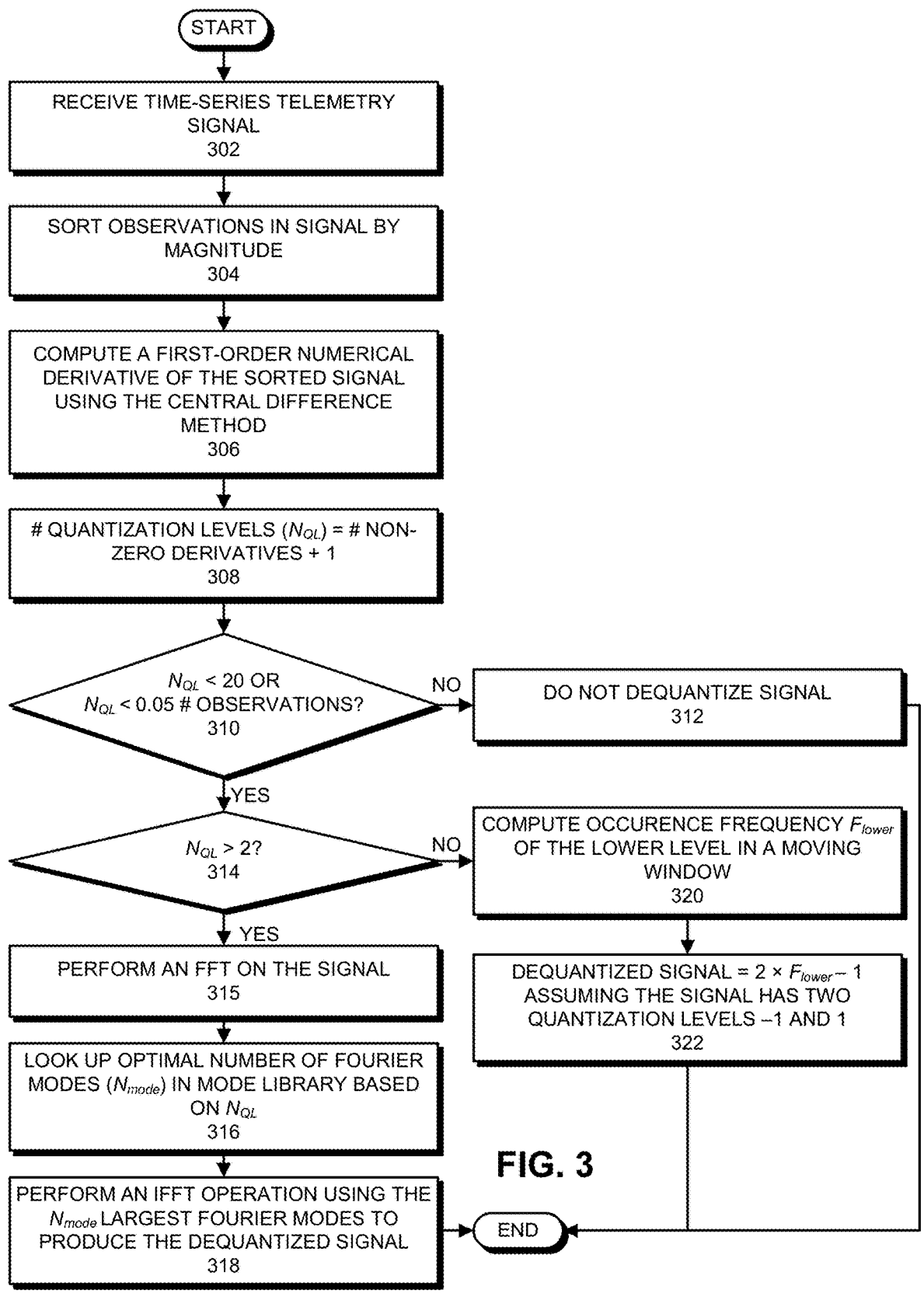
FIG. 3 presents a flow chart illustrating a dequantization process in accordance with the disclosed embodiments.

More specifically, FIG. 3 presents a flow chart illustrating an exemplary dequantization process in accordance with the disclosed embodiments. Note that all of the available telemetry time-series signals are examined one at a time to automatically identify signals that are so quantized that the quantization effects will adversely affect the accuracy of prognostic-surveillance techniques. In some embodiments, we have set 20 to be the threshold number of quantization levels, below which it is desirable to improve accuracy by dequantizing. With more than 20 quantization levels, empirical results show that there is little difference in prognostic accuracy compared with continuous signals. Below 20 quantization levels, the adverse effects on prognostic accuracy increase as the number of quantization levels decreases. For example, a signal that is quantized into just three (or the limiting case, just two) signal levels will provide almost no benefit for prognostic accuracy because the resolution of the signal is so poor.

The telemetry time series signals are automatically dequantized on a signal-by-signal basis. More specifically, each signal is processed using the technique illustrated by the flow chart in FIG. 3. At the start of the technique, the system receives a time-series telemetry signal (step 302). Next, the system determines the number of quantization levels in the signal in a manner that requires no human interaction. First, the system sorts the observations in the time-series signal by magnitude (step 304). During this process, the observations are treated as x, y pairs, wherein x is the time axis, and y is the vertical axis, in whatever units the signals are measured in (e.g., volts, RPMs, gallons-per-min, amperage). Now that the pairs have been sorted with respect to the magnitude y, we "throw away" the x values (which were the timestamps) and substitute an observation number for each x value. Note that we are effectively creating a new pseudo-time-series, but with y values sorted in ascending order. Note that if there is some granularity in the y observations, the sorted y values will comprise a stair-step increasing function of the observation number. To automatically determine the number of steps in the newly transformed stair-step function (in a manner that in no way depends upon the units or magnitudes associated with the original signals), we compute a first-order numerical derivative of the sorted signal using the central difference method (step 306). We then determine the number of quantization levels ($N_{QL}$) to be the number of non-zero derivatives plus one (step 308). Note that the advantage of this new automatic technique for determining the number of quantization levels is that it removes the human from the process.

Next, the system determines whether $N_{QL}$ is smaller than 20, or smaller than 5% of the number of observations (step 310). If so (YES at step 310), the signal is deemed to be quantized and the system proceeds to step 314. If not (NO at step 310), the system is deemed not to be quantized, so the system does not dequantize the signal (step 312). At this point, the dequantization process is complete for the signal.

On the other hand, for a signal that is deemed to be quantized, the system determines whether the number of quantization levels in the signal is greater than two (step 314). If so (YES at step 314), the system dequantizes the signal using a new improved version of the Fourier decomposition and reconstruction technique disclosed in U.S. Pat. No. 7,248,980 (cited above). While executing the Fourier decomposition and reconstruction technique, the system first performs an FFT operation on the signal (step 315). The system then looks up an optimal number of Fourier modes $N_{mode}$ to be used in constructing the dequantized signal in a mode library based on $N_{QL}$ (step 316).

Note that this mode library is constructed based on exhaustive investigations of over thousands of quantized signals spanning a wide range of magnitudes, signal-to-noise ratios, and quantization levels, wherein the optimum number of modes $N_{mode}$ is computed for each quantization level. More specifically, to construct the mode library we first use a Monte Carlo simulation to generate thousands of unquantized signals. Then, we quantize the signals, but in doing so we retain the original unquantized signals as "ground truth" signals. Now, for each quantization level (for example, ranging from 2 up to 20), we run through the FFT a large number of times to produce a computed number of modes. But now, since we know the ground truth, we can perform an inverse FFT and can then compare the unquantized signal to the original ground truth signal to determine the optimum number of modes for the specific quantization level. It is these optimum number of modes values that are stored in the mode library.

Next, the system performs an inverse FFT (IFFT) operation using the $N_{mode}$ largest magnitude Fourier modes to produce a dequantized signal (step 318). In the case where there are only two quantization levels (NO at step 314), the signal is dequantized by first computing the occurrence frequency of the lower level $F_{lower}$ in a sliding window (step 320). The system then computes the dequantized signal to be $2 \times F_{lower} - 1$ assuming the signal has two quantization levels −1 and 1 (step 322).

We have conducted extensive analyses using signals for which we know the true value before the signals were quantized. We then used these "true" high-accuracy measurements to assess the accuracy of the dequantization process described above. In all cases, including the limiting case of just two quantization levels, the new technique converts low-resolution quantized signals into highly accurate output signals, and in doing so improves the resolution of the signals by a factor of from 10 to 100. For example, in the worst case of a signal having only two quantization levels, such as −1 and 1, the best that one could say about that variable is that its most likely value is "zero, plus or minus 1." Using the new technique, for any given point in time, we are able to say that the value is, for example, "0.26 plus or minus 0.01." This increased accuracy for the dequantized signal makes it possible to accurately compute the serial correlation and cross correlation for the dequantized signal, which is important for downstream prognostic-surveillance techniques.

Figure 4:
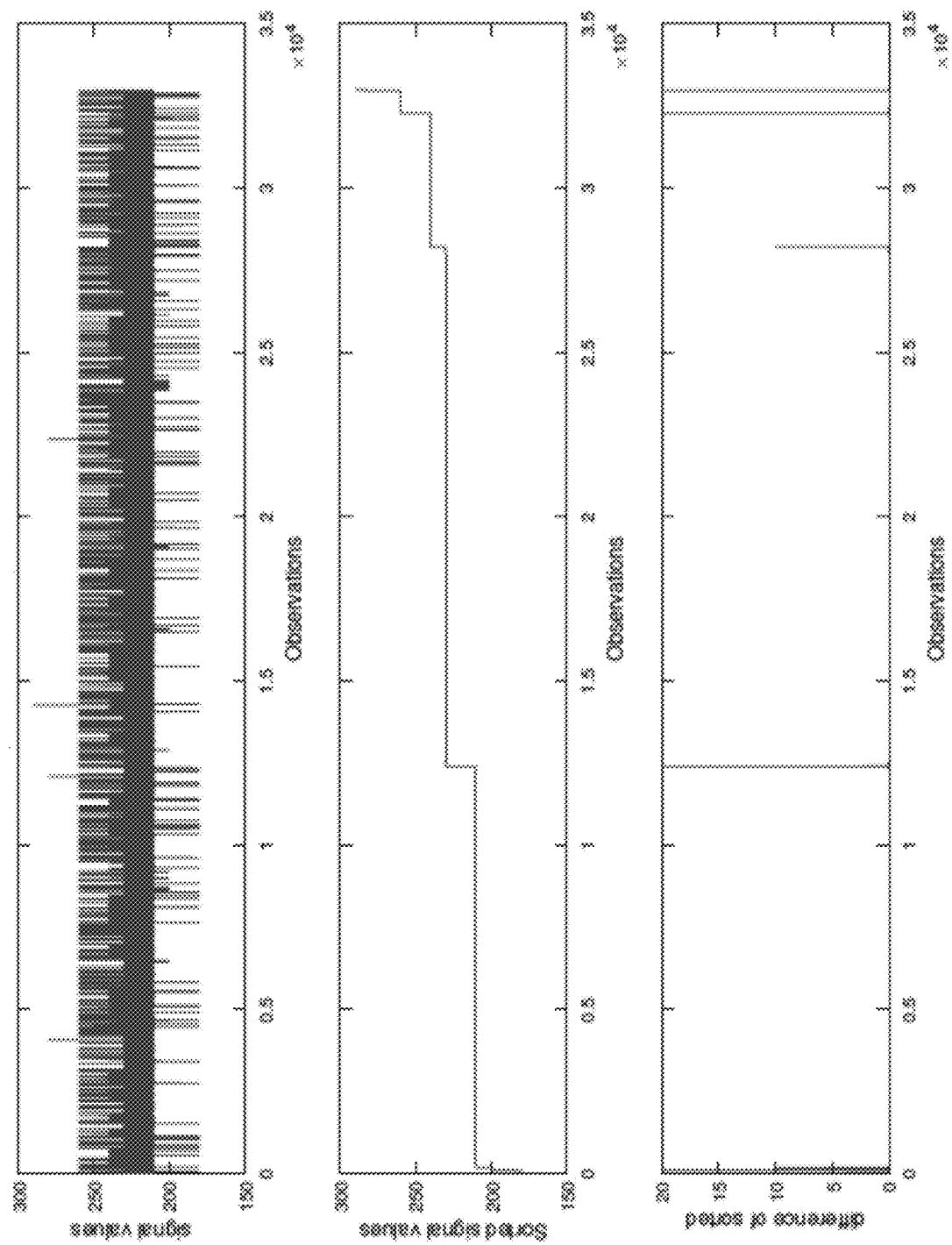
FIG. 4 illustrates a process for finding the number of quantization levels in a signal in accordance with the disclosed embodiments.

FIG. 4 illustrates results of the above-described technique for finding the number of quantization levels. The upper graph in FIG. 4 illustrates the original quantized signal. The middle graph illustrates the observations sorted in ascending order. Finally, the lower graph illustrates the 1st order derivative of the sorted values. If the number of non-zero values in the derivative is smaller than 20 or smaller than 5% of the number of observations, the quantization levels are the unique values in the sorted series. Note that the number of quantization level is found to be eight in the example illustrated in FIG. 4.

Figure 5:
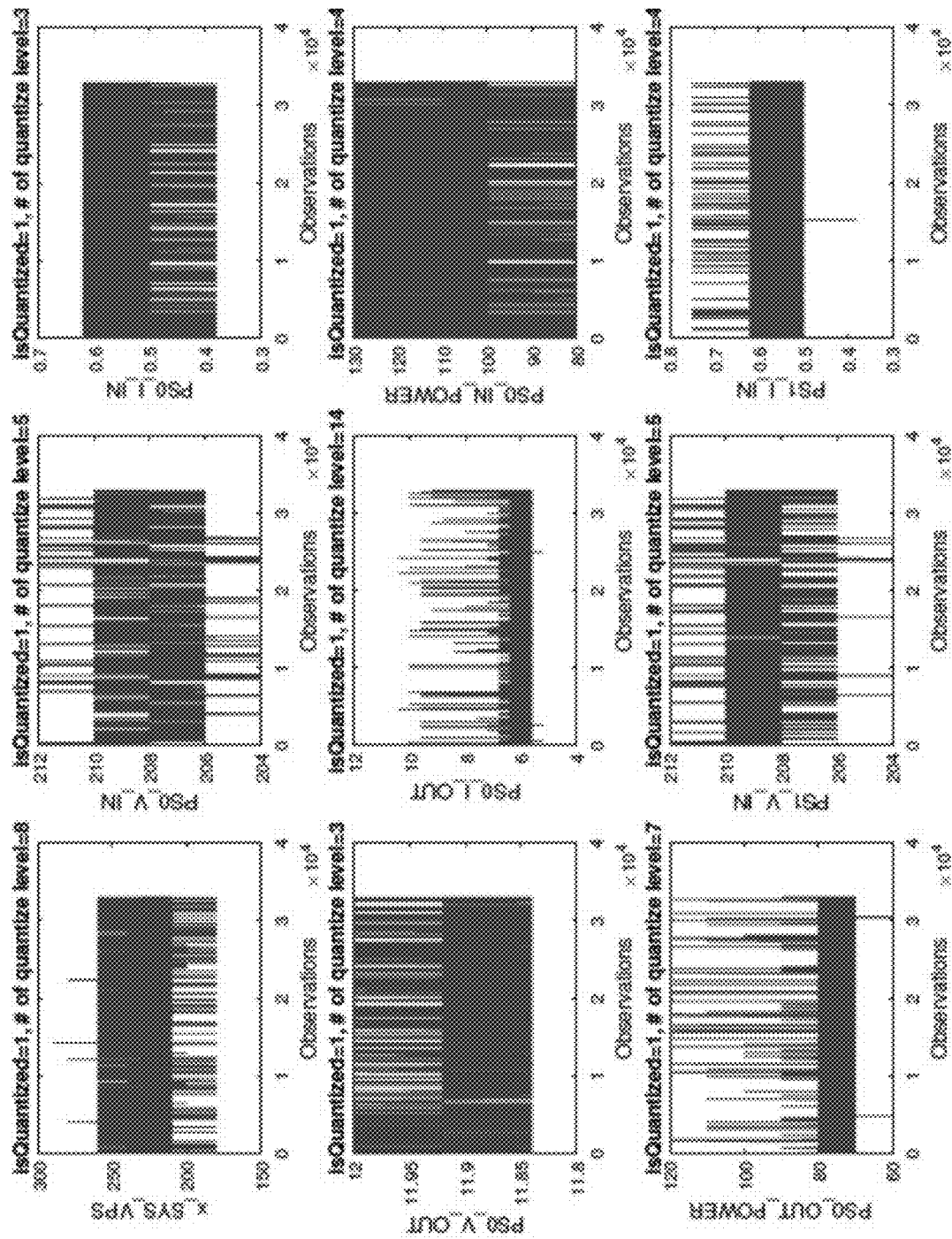
FIG. 5 illustrates sample results for the process of finding the number of quantization levels in accordance with the disclosed embodiments.

FIG. 5 illustrates several more exemplary quantized signals. Note that for all nine signals illustrated in FIG. 5, the technique finds the number of quantization levels correctly.

Figure 6:
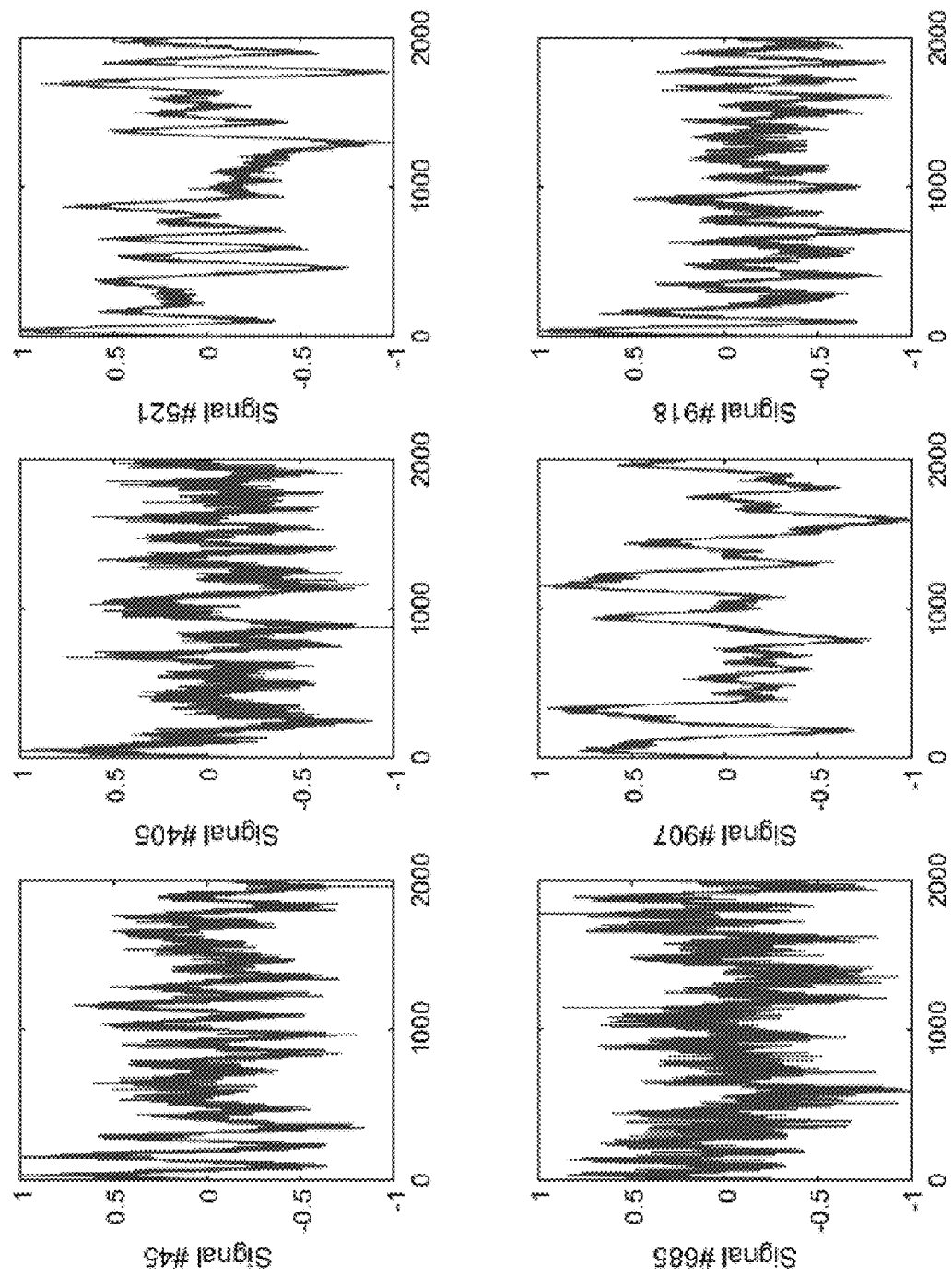
FIG. 6 illustrates sample signals used to build an empirical library containing optimal numbers of Fourier modes $N_{mode}$ for different numbers of quantization levels in accordance with the disclosed embodiments.

The library of modes used in step 316 above was built by performing experiments using 1,000 generated signals. The signals used in this example were simulated to possess characteristics observed in real applications. We have also scaled the exemplary 1,000 signals to range from −1 to 1. (However, it will be obvious to one skilled in the art that our technique is agnostic with respect to the original magnitude or units of the time-series signals.) A few exemplary signals from the set of 1,000 signals are shown in FIG. 6.

Note that each signal is quantized to a certain number of levels (ranging from two to 16); then, the quantized signal is processed using the dequantization technique described above. The dequantized signal is then compared against the original signal. The number of modes $N_{mode}$ in the experiment ranges from 1 to one-half of the number of observations. After trying all possible values of $N_{mode}$, the $N_{mode}$ that produced the lowest RMSE when comparing the dequantized signal against the original signal was selected as the "optimal number of modes" to store in a library.

Figure 7A:
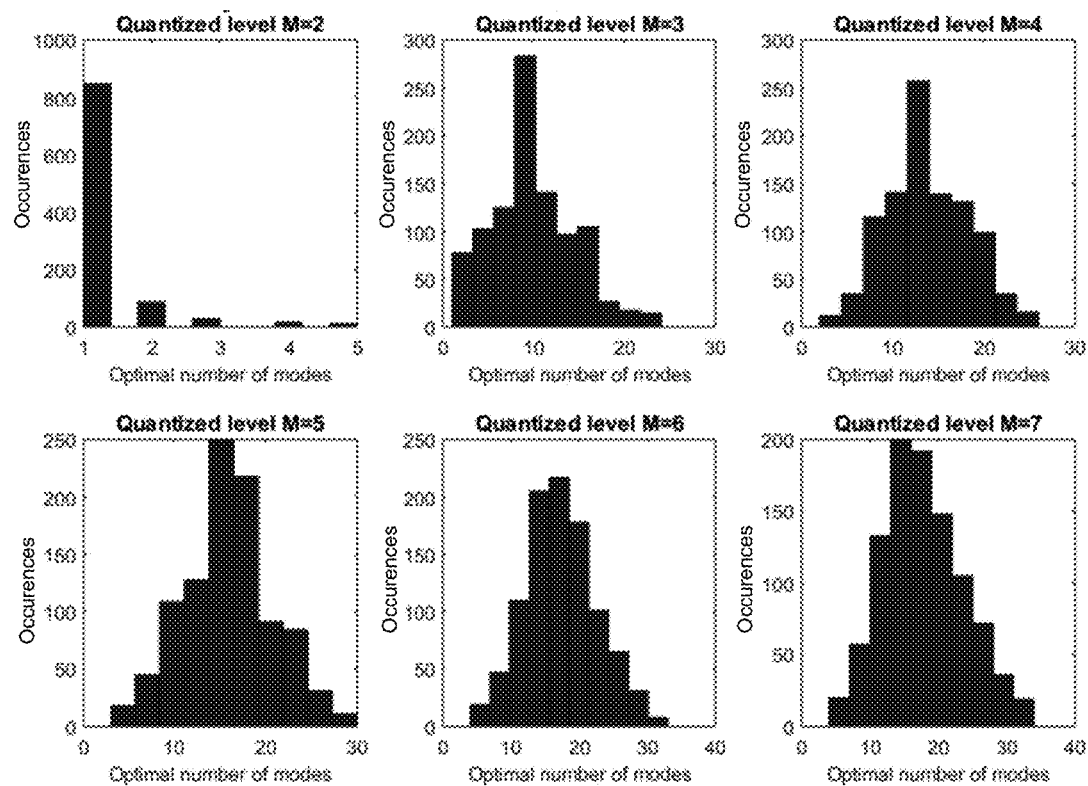
FIGS. 7A-7B illustrate occurrences of the optimal number of modes of a set of signals for different quantization levels in accordance with the disclosed embodiments.
Figure 7B:
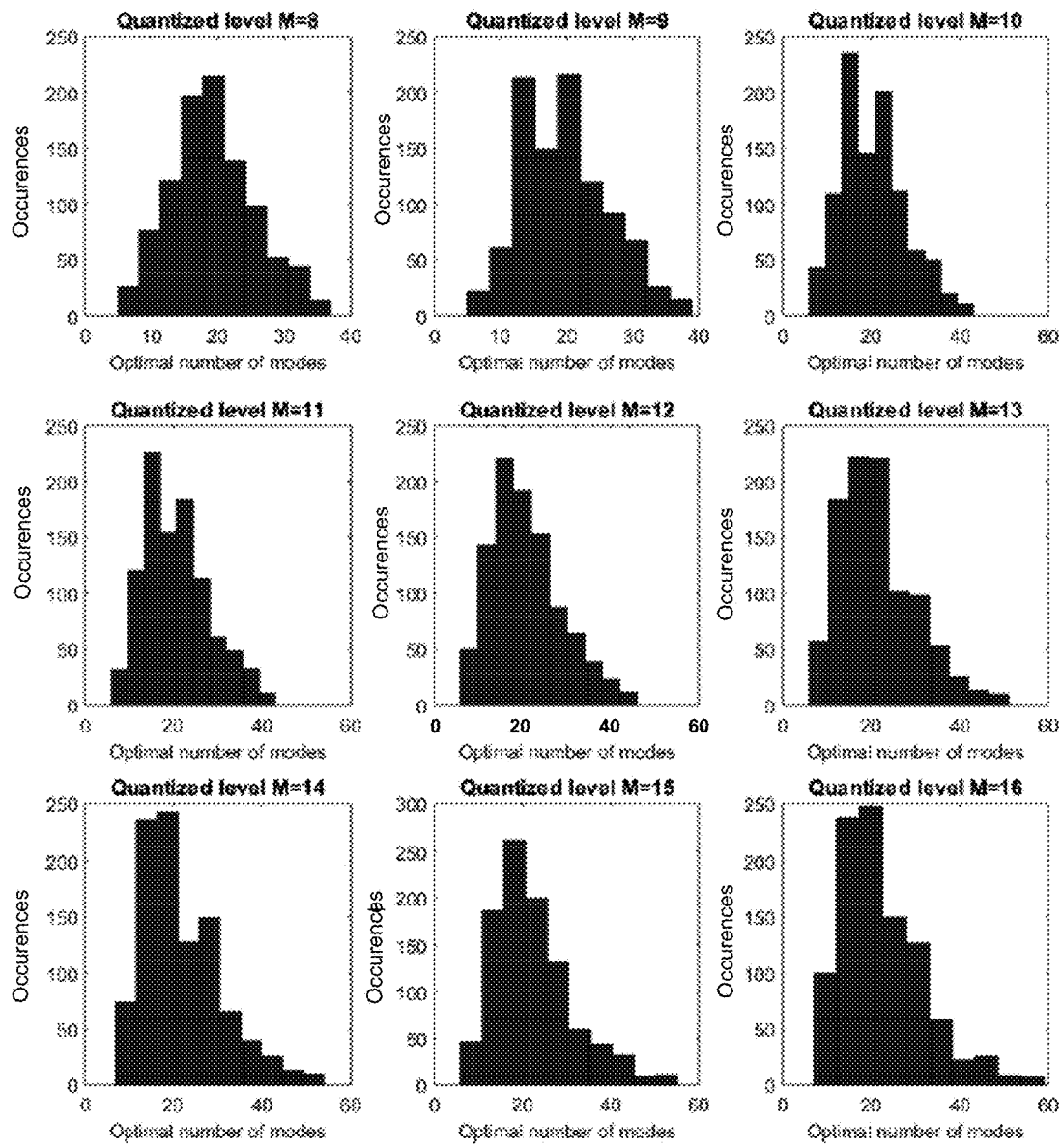

FIGS. 7A-7B show the occurrence of optimal numbers of modes of all 1,000 signals for different numbers of quantization levels. The most frequently occurring modes were tabulated to build a library of modes, which is illustrated in the table that appears in FIG. 7C. Note that the quantization RMSEs also appear in this table. Also note that the row for two quantization levels illustrates that an unacceptably large RMSE is obtained if one tries to use the Fourier decomposition and reconstruction technique for just two quantization levels.

Figure 8:
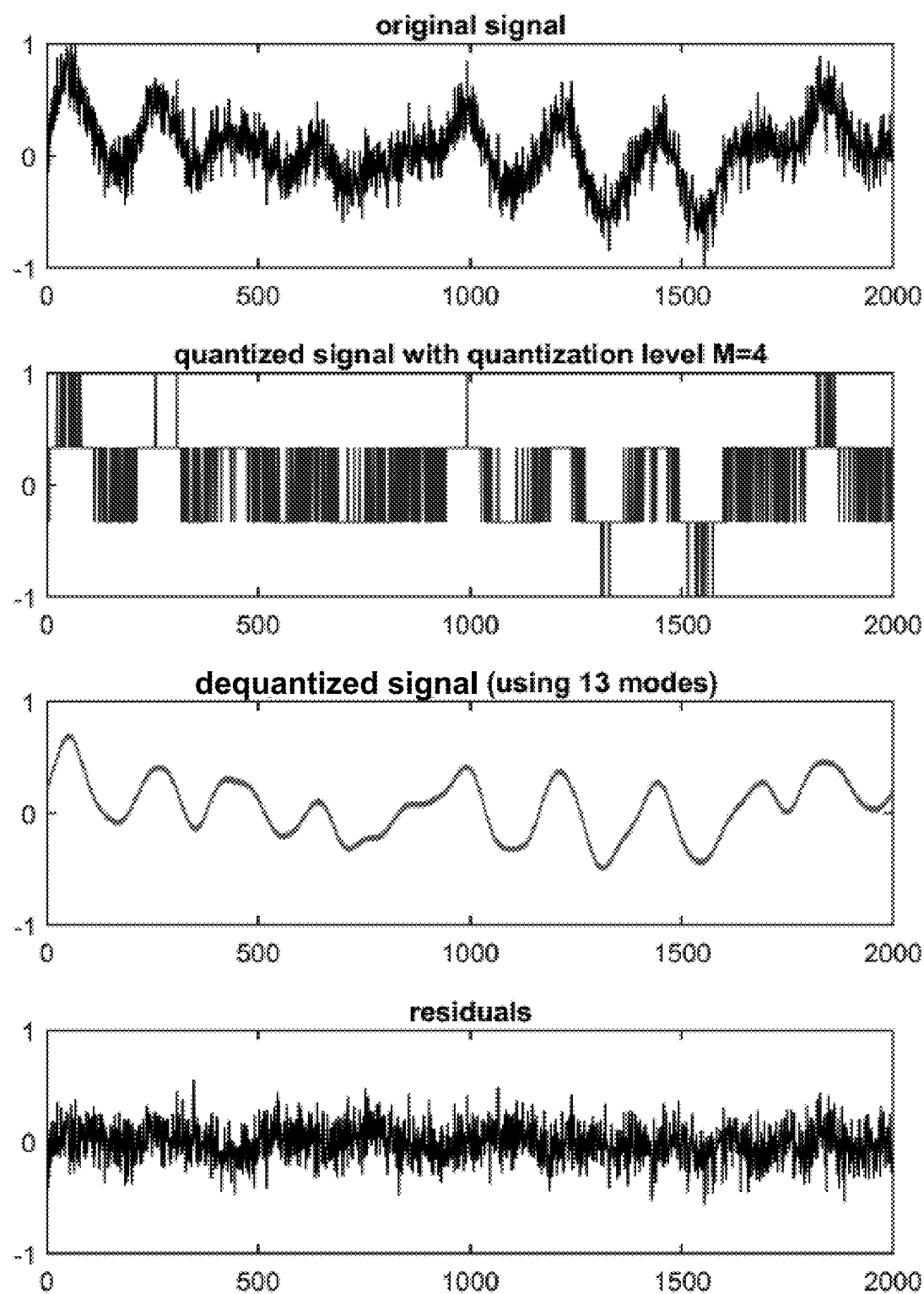
FIG. 8 shows the results of dequantizing a randomly selected signal with four quantization levels.

FIG. 8 shows the results of dequantizing a randomly selected signal with four quantization levels. Note that the dequantized signal captures the trend of the original signal, and the residual comprises nearly stationary white noise as is desired.

Figure 9:
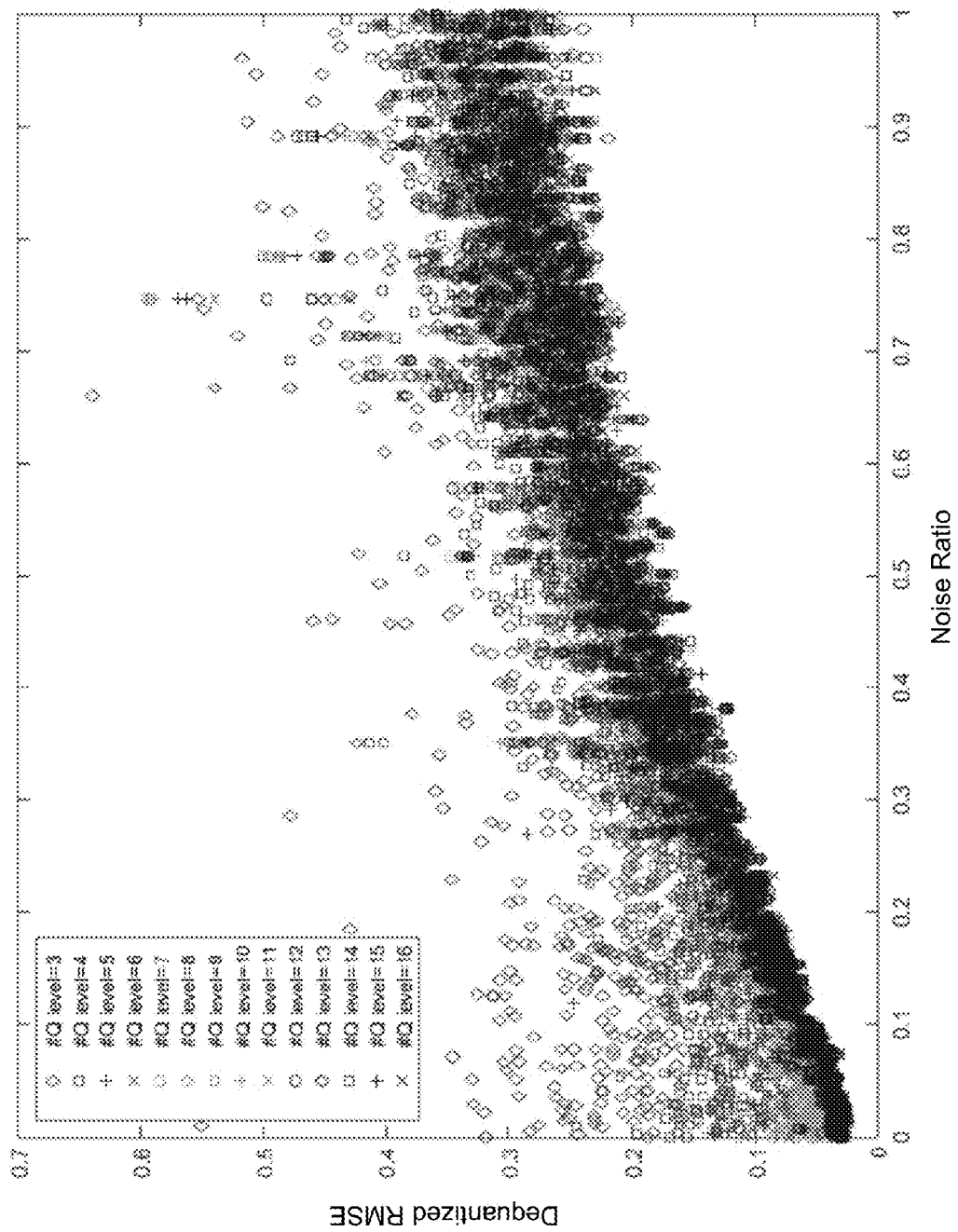
FIG. 9 presents a graph of the dequantized root-mean squared error (RMSE) with respect to noise ratio for different numbers of quantization levels in accordance with the disclosed embodiments.

FIG. 9 plots the dequantization RMSE for each quantization level with respect to noise-to-signal ratio. Note that when the quantization level is above four, the RMSE is mainly caused by the noise, indicating that the dequantization technique successfully captures the deterministic part of the original signals.

Figure 10:
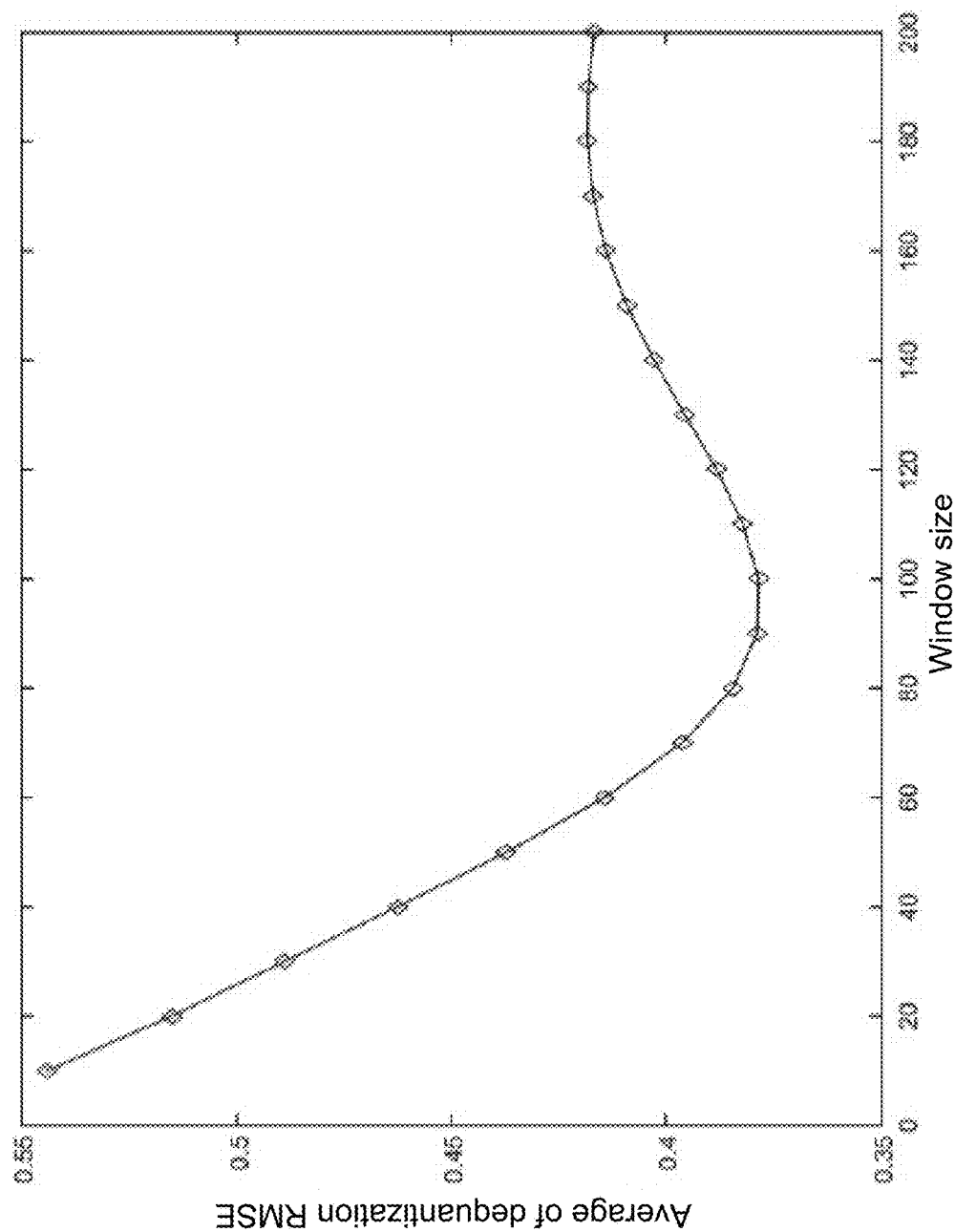
FIG. 10 presents a graph illustrating the average dequantized RMSE with respect to sliding window size in accordance with the disclosed embodiments.

For signals identified to have only two quantization levels, the above-described sliding-window technique was used to perform the dequantization operation. Recall that $F_{lower}$ is calculated as the occurrence frequency of the lower level (−1 in this example) using a sliding window that encloses a given width of observations. FIG. 10 illustrates the dequantizing RMSE for 1,000 signals with respect to the sliding window size. In some cases, a sliding window size of 100 observations (1/10 of the number of observations) is selected as a good value for obtaining high-accuracy dequantized output signals and at a reasonable compute cost. By examining FIG. 10, it can be seen that a sliding window size of 100 is very close to optimal.

Figure 11:
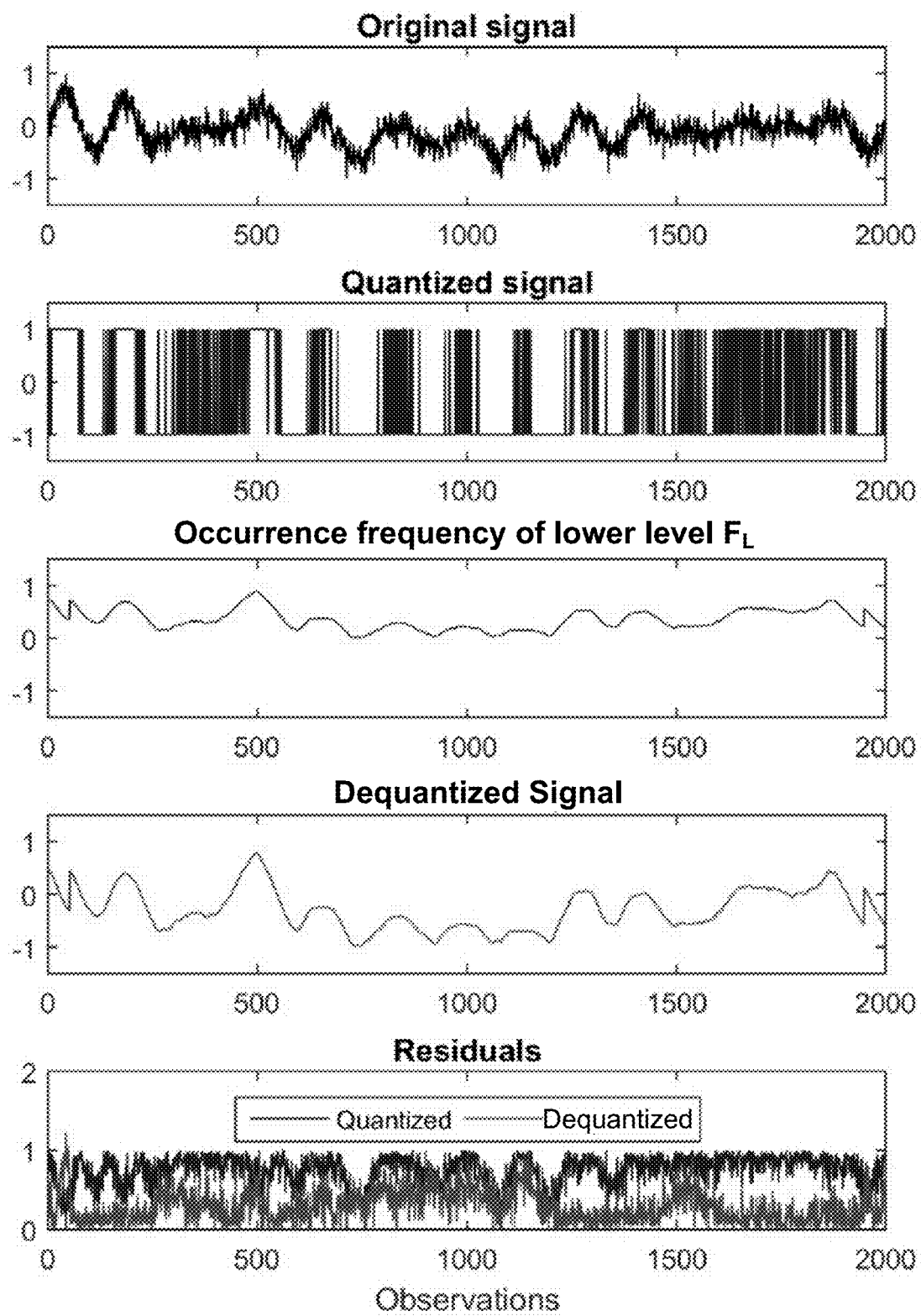
FIG. 11 illustrates the results of dequantizing a signal with two quantization levels in accordance with the disclosed embodiments.

The dequantized signal is then computed to be $2 \times F_{lower} - 1$ as linearly scaled to quantized values of −1 and 1 for this example. (However, for general signals, the technique can be scaled to the units of the original measured general signals.) FIG. 11 illustrates exemplary results for dequantizing a signal with two quantization levels in accordance with the disclosed embodiments. Note that the dequantized signal generally captures the deterministic part of the original signal.

Figure 12:
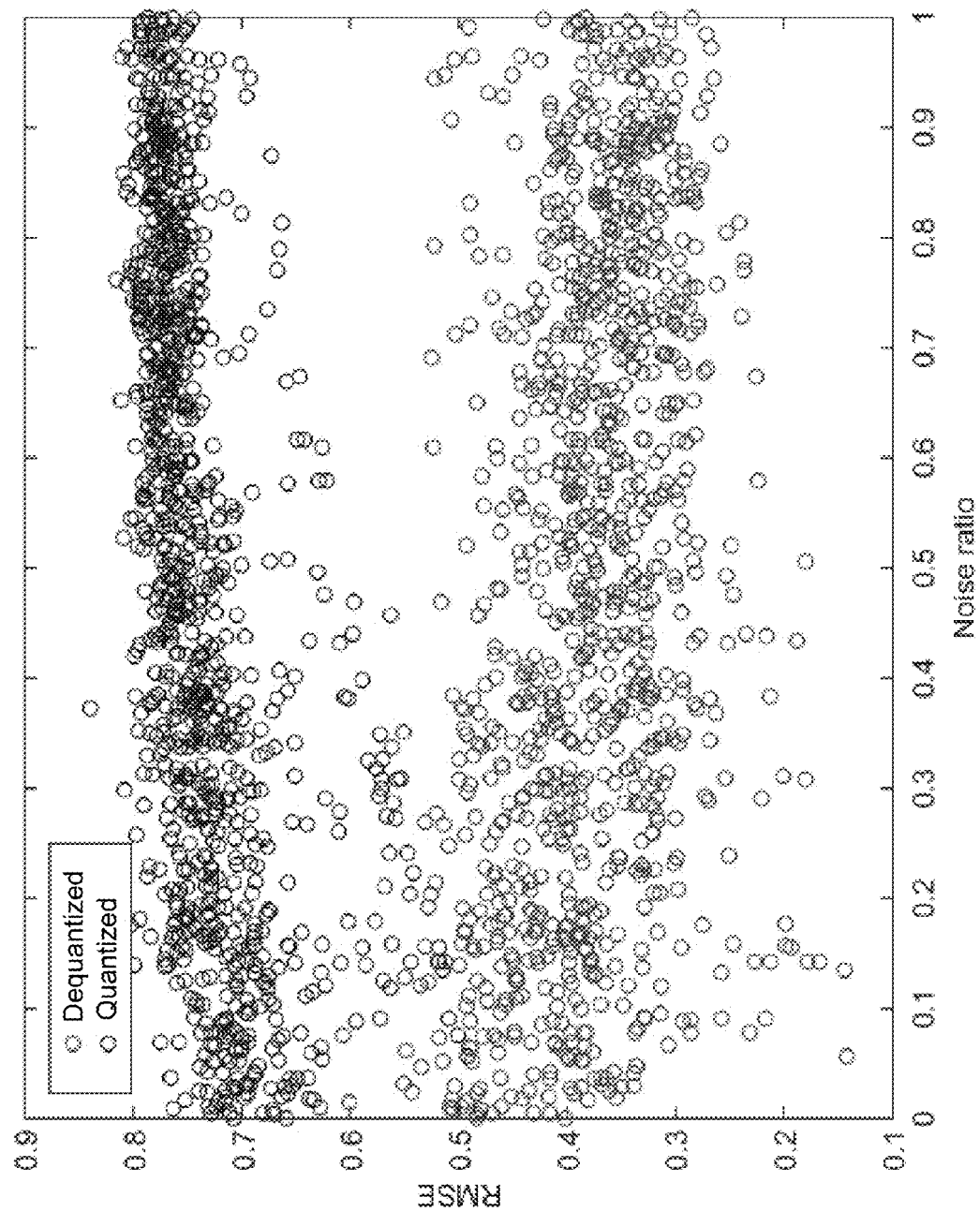
FIG. 12 presents a graph of both quantized and dequantized RMSE values with respect to noise ratio for a signal with only two quantization levels in accordance with the disclosed embodiments.

FIG. 12 plots the RMSE for both quantized and dequantized signals with respect to noise ratio in accordance with the disclosed embodiments. Note that the dequantized signals have substantially lower RMSEs, as is desired. Also note that the RMSE for the dequantized signals is extremely close to the "measurement error" for the original (dequantized) signals, which is the best that can possibly be achieved.

For additional clarification of this important point, suppose a transducer possesses a measurement bias of 1%. Now suppose that we digitize the signal produced by the transducer using an extremely accurate 16-bit A/D chip, and then we digitize that same signal with a cheap, poor-resolution 4-bit A/D chip. The extremely accurate signal from the 16-bit chip will still show the inherent transducer bias of 1%, while the poor-resolution 4-bit chip will show a much bigger bias, because of the lack of resolution. The optimum quantization technique will get the bias back to 1%, but cannot do any better because of the inherent bias of the transducer. This illustrates that our new dequantization technique does not (and cannot) drive the RMSE to zero because there is an inherent measurement error in the transducers. Hence, the value of the new dequantization technique described above is to drive the RMSE down toward the inherent measurement error.

Prognostic Surveillance

Figure 13:
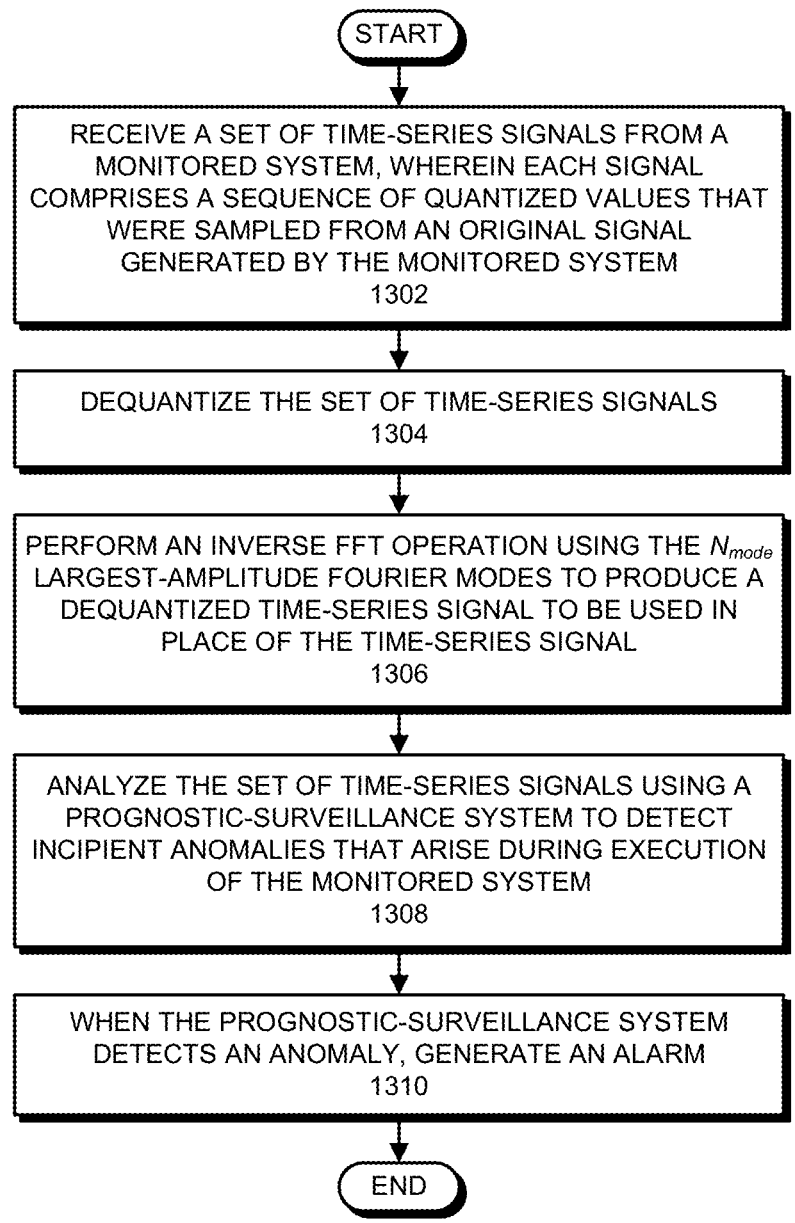
FIG. 13 presents a flow chart illustrating the process of using a prognostic-surveillance system to detect an anomaly in accordance with the disclosed embodiments.

FIG. 13 presents a flow chart illustrating the process of using a prognostic-surveillance system to detect an anomaly in accordance with the disclosed embodiments. During operation, the system receives the set of time-series signals from a monitored system, wherein each signal comprises a sequence of quantized values that were sampled from an original signal generated by the monitored system (step 1302). Next, the system dequantizes each signal in the set of time-series signals (step 1304). The system then performs an inverse FFT operation using the $N_{mode}$ largest-amplitude Fourier modes to produce a dequantized time-series signal to be used in place of the time-series signal (step 1306). The system then analyzes the set of time-series signals using a prognostic-surveillance system to detect incipient anomalies that arise during execution of the monitored system (step 1308). Finally, when the prognostic-surveillance system detects an anomaly, the system generates an alarm (step 1310).

Dequantization Process

Figure 14:
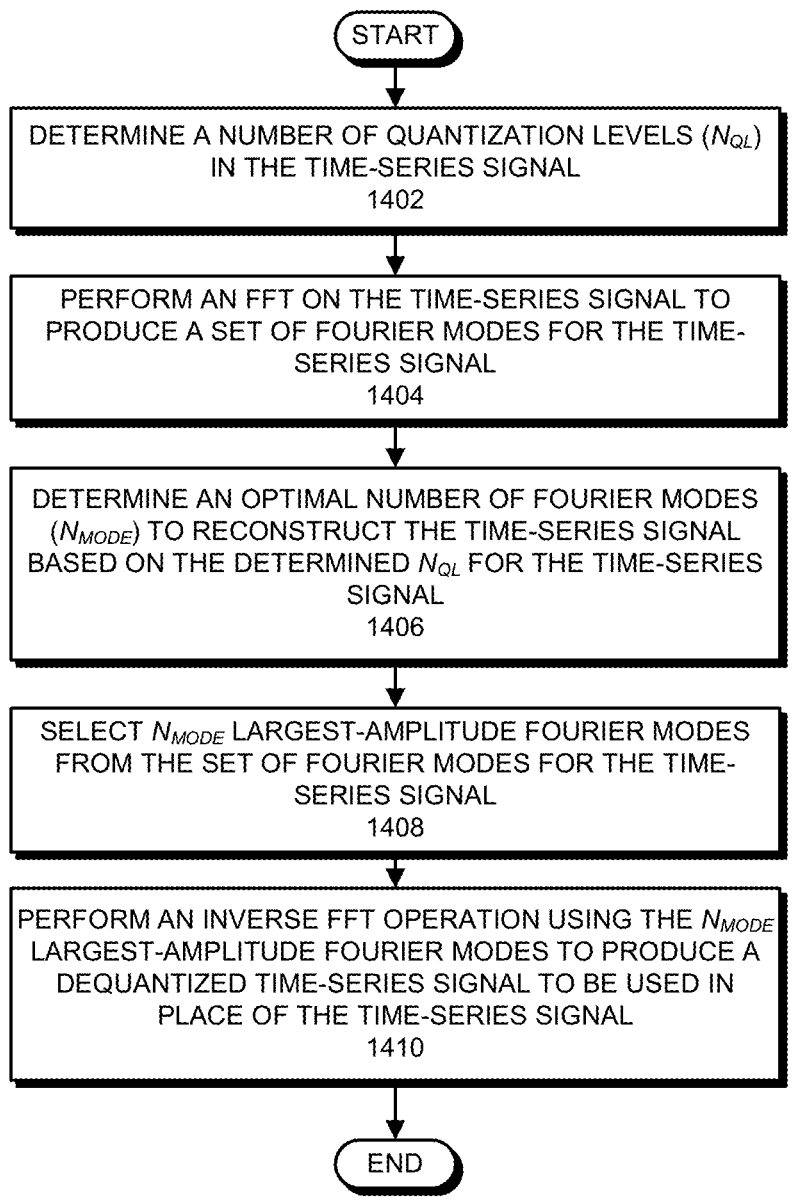
FIG. 14 presents a flow chart illustrating the process of dequantizing a low-resolution quantized signal in accordance with the disclosed embodiments.

FIG. 14 presents a flow chart illustrating the process of dequantizing a low-resolution quantized signal in accordance with the disclosed embodiments. (Note that this operation is performed for each signal in the set of signals during step 1304 in the flow chart in FIG. 13.) First, the system determines a number of quantization levels ($N_{QL}$) in the time-series signal (step 1402). The system then performs a fast Fourier transform (FFT) on the time-series signal to produce a set of Fourier modes for the time-series signal (step 1404). Next, the system determines an optimal number of Fourier modes ($N_{mode}$) to reconstruct the time-series signal based on the determined $N_{QL}$ for the time-series signal (step 1406). The system then selects the $N_{mode}$ largest-amplitude Fourier modes from the set of Fourier modes for the time-series signal (step 1408). Finally, the system performs an inverse FFT operation using the $N_{mode}$ largest-amplitude Fourier modes to produce a dequantized time-series signal to be used in place of the time-series signal (step 1410).

Figure 15:
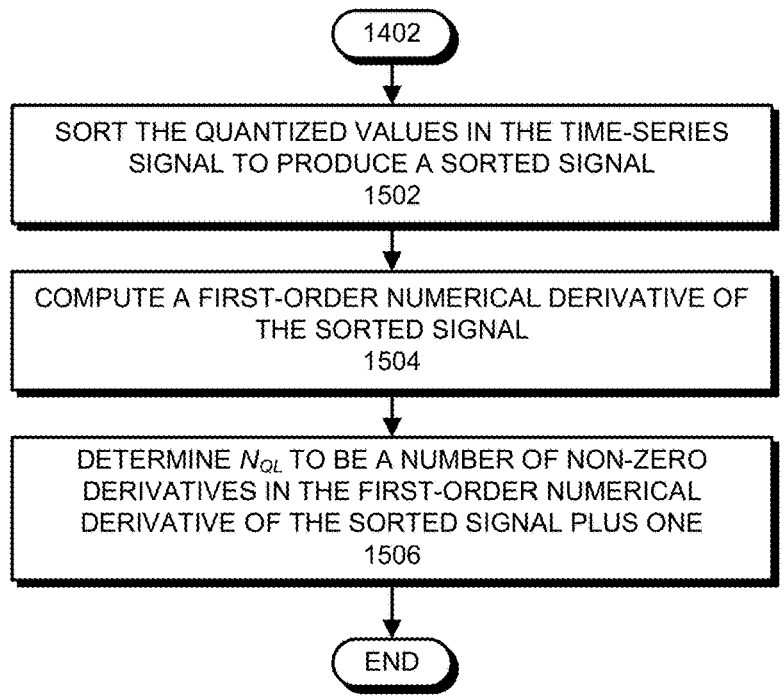
FIG. 15 presents a flow chart illustrating the process of determining a number of quantization levels in a quantized signal in accordance with the disclosed embodiments.

FIG. 15 presents a flow chart illustrating the process of determining a number of quantization levels in a quantized signal in accordance with the disclosed embodiments. (Note that this operation is performed during step 1402 in the flow chart in FIG. 14.) The system first sorts the quantized values in the time-series signal to produce a sorted signal (step 1502). Next, the system computes a first-order numerical derivative of the sorted signal (step 1504). Finally, the system determines $N_{QL}$ to be a number of non-zero derivatives in the first-order numerical derivative of the sorted signal plus one (step 1506).

Figure 16:
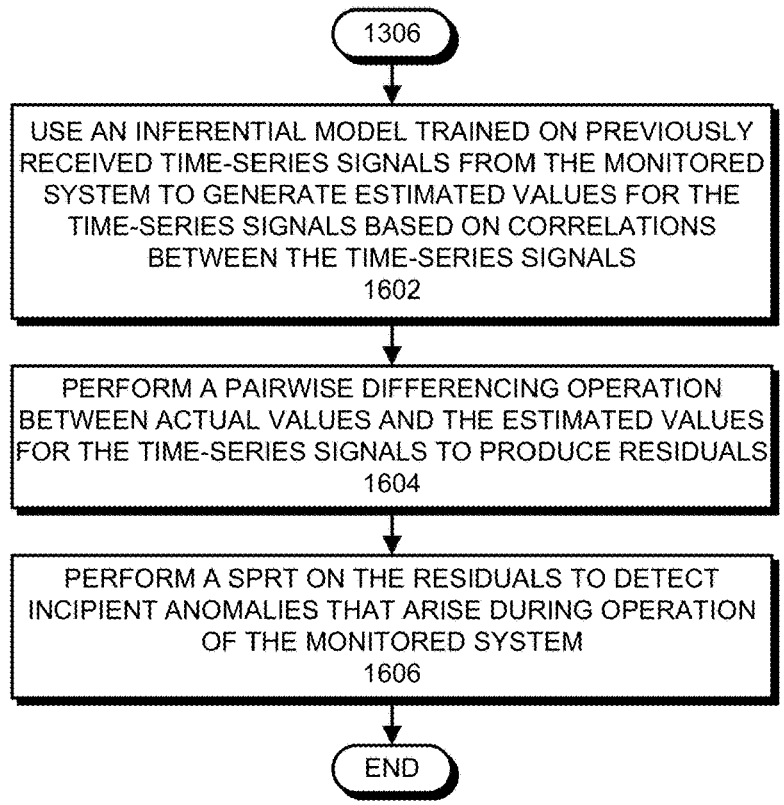
FIG. 16 presents a flow chart illustrating the process of analyzing a set of time-series signals using a prognostic-surveillance system in accordance with the disclosed embodiments.

FIG. 16 presents a flow chart illustrating the process of analyzing a set of time-series signals using a prognostic-surveillance system in accordance with the disclosed embodiments. (Note that this operation is performed during step 1308 in the flow chart in FIG. 13.) The system first uses an inferential model trained on previously received time-series signals from the monitored system to generate estimated values for the time-series signals based on correlations between the time-series signals (step 1602). Next, the system performs a pairwise differencing operation between actual values and the estimated values for the time-series signals to produce residuals (step 1604). Finally, the system performs a sequential probability ratio test (SPRT) on the residuals to detect incipient anomalies that arise during operation of the monitored system (step 1606).

Various modifications to the disclosed embodiments will be readily apparent to those skilled in the art, and the general principles defined herein may be applied to other embodiments and applications without departing from the spirit and scope of the present invention. Thus, the present invention is not limited to the embodiments shown, but is to be accorded the widest scope consistent with the principles and features disclosed herein.

The foregoing descriptions of embodiments have been presented for purposes of illustration and description only. They are not intended to be exhaustive or to limit the present description to the forms disclosed. Accordingly, many modifications and variations will be apparent to practitioners skilled in the art. Additionally, the above disclosure is not intended to limit the present description. The scope of the present description is defined by the appended claims.

What is claimed is:

1. A method for removing quantization effects from a set of time-series signals to produce highly accurate approximations of a set of original unquantized signals, comprising:
   receiving the set of time-series signals from a monitored system, wherein each signal comprises a sequence of quantized values that were sampled from an original signal generated by the monitored system;
   for each time-series signal in the set of time-series signals,
     determining a number of quantization levels ($N_{QL}$) in the time-series signal;
     performing a fast Fourier transform (FFT) on the time-series signal to produce a set of Fourier modes for the time-series signal;
     determining an optimal number of Fourier modes ($N_{mode}$) to reconstruct the time-series signal based on the determined $N_{QL}$ for the time-series signal; selecting $N_{mode}$ largest-amplitude Fourier modes from the set of Fourier modes for the time-series signal; and
     performing an inverse FFT operation using the $N_{mode}$ largest-amplitude Fourier modes to produce a dequantized time-series signal to be used in place of the time-series signal;
   analyzing the dequantized time-series signals using a prognostic-surveillance system to detect incipient anomalies that arise during execution of the monitored system; and
   when the prognostic-surveillance system detects an anomaly, generating an alarm.

2. The method of claim 1, wherein determining the number of quantization levels in the time-series signal includes:
   sorting the quantized values in the time-series signal to produce a sorted signal;
   computing a first-order numerical derivative of the sorted signal; and
   determining $N_{QL}$ to be a number of non-zero derivatives in the first-order numerical derivative of the sorted signal plus one.

3. The method of claim 1, wherein determining $N_{mode}$ for the time-series signal involves performing a lookup in a library of pre-determined optimal $N_{mode}$ values based on the determined $N_{QL}$ for the time-series signal.

4. The method of claim 1, wherein detecting an incipient anomaly comprises detecting an impending failure of the monitored system.

5. The method of claim 1, wherein analyzing the dequantized time-series signals using the prognostic-surveillance system comprises: using an inferential model trained on previously received time-series signals from the monitored system to generate estimated values for the dequantized time-series signals;
   performing a pairwise differencing operation between actual values and the estimated values for the dequantized time-series signals to produce residuals; and
   performing a sequential probability ratio test (SPRT) on the residuals to detect incipient anomalies that arise during operation of the monitored system.

6. The method of claim 5, wherein the inferential model is trained using a nonlinear, nonparametric (NLNP) regression technique.

7. The method of claim 6, wherein the NLNP regression technique comprises a Multivariate State Estimation Technique (MSET).

8. A system that removes quantization effects from a set of time-series signals to produce highly accurate approximations of a set of original unquantized signals, comprising:
   at least one processor and at least one associated memory;
   a dequantization mechanism that executes on the at least one processor, wherein during operation, the dequantization mechanism:
     receives the set of time-series signals from a monitored system, wherein each signal comprises a sequence of quantized values that were sampled from an original signal generated by the monitored system;
     for each time-series signal in the set of time-series signals,
       determines a number of quantization levels ($N_{QL}$) in the time-series signal;
       performs a fast Fourier transform (FFT) on the time-series signal to produce a set of Fourier modes for the time-series signal;
       determines an optimal number of Fourier modes ($N_{mode}$) to reconstruct the time-series signal based on the determined $N_{QL}$ for the time-series signal;
       selects $N_{mode}$ largest-amplitude Fourier modes from the set of Fourier modes for the time-series signal; and performs an inverse FFT operation using the $N_{mode}$ largest-amplitude Fourier modes to produce a dequantized time-series signal to be used in place of the time-series signal; and
   a prognostic-surveillance mechanism that executes on the at least one processor, wherein during operation, the prognostic-surveillance mechanism:
     analyzes the dequantized time-series signals using a prognostic-surveillance system to detect incipient anomalies that arise during execution of the monitored system; and
     when the prognostic-surveillance system detects an anomaly, generates an alarm.

9. The system of claim 8, wherein determining the number of quantization levels in the time-series signal includes:
   sorting the quantized values in the time-series signal to produce a sorted signal;
   computing a first-order numerical derivative of the sorted signal; and
   determining $N_{QL}$ to be a number of non-zero derivatives in the first-order numerical derivative of the sorted signal plus one.

10. The system of claim 8, wherein determining $N_{mode}$ for the time-series signal involves performing a lookup in a library of pre-determined optimal $N_{mode}$ values based on the determined $N_{QL}$ for the time-series signal.

11. The system of claim 8, wherein detecting an incipient anomaly comprises detecting an impending failure of the monitored system.

12. The system of claim 8, wherein while analyzing the dequantized time-series signals, the prognostic-surveillance mechanism:

uses and inferential model trained on previously received time-series signals from the monitored system to generate estimated values for the dequantized time-series signal;

performs a pairwise differencing operation between actual values and the estimated values for the dequantized time-series signals to produce residuals; and performs a sequential probability ration test (SPRT) on the residuals to detect incipient anomalies that arise during the operation of the monitored system.

13. The system of claim 12, wherein the inferential model is trained using a Multivariate State Estimation Technique (MSET).

14. A non-transitory computer-readable storage medium storing instructions that when executed by a computer cause the computer to perform a method for removing quantization effects from a set of time-series signals to produce highly accurate approximations of a set of original unquantized signals, the method comprising:

receiving the set of time-series signals from a monitored system, wherein each signal comprises a sequence of quantized values that were sampled from an original signal generated by the monitored system;

for each time-series signal in the set of time-series signals,
determining a number of quantization levels ($N_{QL}$) in the 11 time-series signal;

performing a fast Fourier transform (FFT) on the time-series signal to produce a set of Fourier modes for the time-series signal;

determining an optimal number of Fourier modes ($N_{mode}$) to reconstruct the time-series signal based on the determined $N_{QL}$ for the time-series signal;

selecting $N_{mode}$ largest-amplitude Fourier modes from the set of Fourier modes for the time-series signal; and performing an inverse FFT operation using the $N_{mode}$ largest-amplitude Fourier modes to produce a dequantized time-series signal to be used in place of the time-series signal;

analyzing the dequantized time-series signals using a prognostic-surveillance system to detect incipient anomalies that arise during execution of the monitored system;

and when the prognostic-surveillance system detects an anomaly, generating an alarm.

* * * * *

UNITED STATES PATENT AND TRADEMARK OFFICE
CERTIFICATE OF CORRECTION

PATENT NO. : 10,496,084 B2
APPLICATION NO. : 15/947548
DATED : December 3, 2019
INVENTOR(S) : Li et al.

It is certified that error appears in the above-identified patent and that said Letters Patent is hereby corrected as shown below:

In the Claims

In Column 13, Line 4, in Claim 12, delete "and" and insert -- an --, therefor.

In Column 13, Line 7, in Claim 12, delete "signal;" and insert -- signals; --, therefor.

In Column 13, Line 11, in Claim 12, delete "ration" and insert -- ratio --, therefor.

In Column 14, Line 5, in Claim 14, after "the" delete "11".

Signed and Sealed this
Sixteenth Day of February, 2021

Drew Hirshfeld
*Performing the Functions and Duties of the*
*Under Secretary of Commerce for Intellectual Property and*
*Director of the United States Patent and Trademark Office*